(12) United States Patent
Backov et al.

(10) Patent No.: US 8,865,618 B2
(45) Date of Patent: Oct. 21, 2014

(54) METHOD FOR PREPARING A CELLULAR CARBON MONOLITH COMPRISING A HIERARCHISED POROUS NETWORK

(75) Inventors: Rénal Backov, Bordeaux-Cauderan (FR); Nicolas Brun, Bordeaux (FR); Clément Sanchez, Bure sur Yvette (FR)

(73) Assignee: Universite Pierre et Marie Curie, Paris (FR)

( * ) Notice: Subject to any disclaimer, the term of this patent is extended or adjusted under 35 U.S.C. 154(b) by 360 days.

(21) Appl. No.: 13/126,560

(22) PCT Filed: Oct. 28, 2009

(86) PCT No.: PCT/FR2009/052085
§ 371 (c)(1),
(2), (4) Date: Jul. 13, 2011

(87) PCT Pub. No.: WO2010/049650
PCT Pub. Date: May 6, 2010

(65) Prior Publication Data
US 2011/0262993 A1 Oct. 27, 2011

(30) Foreign Application Priority Data
Oct. 30, 2008 (FR) ...................................... 08 06051

(51) Int. Cl.
*B01J 20/00* (2006.01)
(52) U.S. Cl.
USPC .......... 502/417; 502/416; 423/445 R; 501/39; 428/220

(58) Field of Classification Search
USPC ............... 423/445 R; 502/400, 401, 416, 417
See application file for complete search history.

(56) References Cited

U.S. PATENT DOCUMENTS

| | | | |
|---|---|---|---|
| 6,261,469 B1 | 7/2001 | Zakhidov et al. | |
| 6,517,763 B1 | 2/2003 | Zakhidov et al. | |
| 7,267,812 B2 * | 9/2007 | Takahashi et al. | ............ 423/712 |
| 2001/0019037 A1 | 9/2001 | Zakhidov et al. | |
| 2005/0074396 A1 | 4/2005 | Takahashi et al. | |
| 2007/0292732 A1 | 12/2007 | Feaver et al. | |

OTHER PUBLICATIONS

Brun, N.; Prabaharan, S. R. S.; Morcrette, M.; Sanchez, C.; Pécastaings, G.; Derré, A.; Soum, A.; Deleuze, H.; Birot, M.; Backov, R. Adv. Funct. Mater. 2009, 19, 3136-3145.*
Search Report dated Jul. 13, 2010.
Hard Macrocellular Silica Si (HIPE) Foams Templating Micro/Macroporous Carbonaceous Monoliths: Applications as Lithium Ion Battery Negative Electrodes and Electrochemical Capacitors.
Hard-Templating Approach Using Silica Si (HIPE) Foams to Generate Micro-Macroporous Carbonaceous Monoliths.
Carbon Monoliths Posessing a Hierarchical, Fully Interconnected Porosity.
Recent Progress in the Synthesis of Porous Carbon Materials.

* cited by examiner

*Primary Examiner* — Richard M Rump
(74) *Attorney, Agent, or Firm* — Sofer & Haroun, LLP (57) ABSTRACT

A carbon or ceramic monolithic materials with an M2 (macroporous/microporous) hierarchised porous structure is provided as well as method for preparing said materials using a macro/meso/microporous silica cavity. Such materials may be used, in particular for the production of hydrogen purifiers, supercapacitors or electrodes, or else for carrying out catalysed chemical reactions in a heterogeneous phase.

16 Claims, 6 Drawing Sheets

METHOD FOR PREPARING A CELLULAR CARBON MONOLITH COMPRISING A HIERARCHISED POROUS NETWORK

RELATED APPLICATIONS

This application is a National Phase application of PCT/FR2009/052085, filed on Oct. 28, 2009, which in turn claims the benefit of priority from French Patent Application Nos. 08 06051, filed on Oct. 30, 2008 the entirety of which is incorporated herein by reference.

BACKGROUND

1. Field of the Invention

The present invention relates to macroporous monolithic materials, in particular to carbon monoliths and to ceramic monoliths comprising an M2 (Macroporous/Microporous) hierarchical porous structure, to a process for the preparation thereof and to the use thereof, in particular in the manufacture of hydrogen purifiers, supercapacitors or electrodes or alternatively in carrying out chemical reactions catalyzed in a heterogeneous phase.

2. Description of Related Art

The materials provided in the form of porous carbon monoliths constitute materials of choice for numerous applications, such as the purification of water and air, adsorption, heterogeneous-phase catalysis, the manufacture of electrodes and the storage of energy, due to their high specific surface, their high pore volume, their insensitivity to the surrounding chemical reactions and their excellent mechanical properties.

These materials comprise a high specific surface and a hierarchical structure, that is to say a cellular structure generally exhibiting a double porosity. They exhibit in particular a mesoporous structure in which the mean pore diameter varies from the order of 2 to 10 nm.

They can be prepared according to two main families of processes.

The first main family of processes uses soft templates and corresponds to the soft templating methods, i.e. to the methods employing organic/organic interactions between a thermopolymerizable polymer (generally carbon precursor) and certain block copolymers of non-ionic polymer type, such as the products sold under the trade names Pluronic® P123 or F127 by BASF, which are used as modeling agent, in order to directly obtain a porous carbonaceous material after carbonization under an inert atmosphere at 350° C. and pyrolysis (Meng Y. et al., Angew. Chem. Int. Ed., 2005, 44, 2).

The second main family of processes uses rigid templates and corresponds to the hard templating or exotemplating methods, i.e. to the methods in which a mesoporous solid template is impregnated with a solution of a precursor of the final material which it is desired to obtain (for example carbon precursor), before being carbonized under a nonoxidizing atmosphere.

The invention which will be described below comes within the scope of the hard templating methods.

More specifically, the hard templating methods employ templates which can be composed in particular of particles of mesoporous silica, of alumina membranes, of zeolites, and the like. In particular, it is known, for example from the paper by K. P. Gierszal et al. (New Journal of Chemistry, 2008, 32, 981-993), to prepare mesoporous carbon monoliths according to a method using matrices formed of mesoporous silica of MCM-48 and KIT-6 type having a cubic 3D structure. According to this process, the silica matrices, in the form of powders, are first of all impregnated with a solution of a carbon precursor, which precursor is subsequently crosslinked within the matrices, and then the matrices are carbonized. The carbonaceous material is finally obtained after removal of the silica template by a treatment with acid. It is provided in the form of a mesoporous material, the pores of which have a mean diameter of between 3 and 5 nm approximately and the pore network of which has a structure which corresponds substantially to the negative of the pore network of the template used. Furthermore, a description has also been given, in particular by Alvarez S. at al. (Advanced Engineering Materials, 2004, 6(11), 897-899), of the preparation of carbon monoliths comprising a macro/mesoporous network by impregnation of a solid template formed of meso/macroporous silica with a solution of a carbon precursor, such as furfuryl alcohol, which is subsequently polymerized within the template before the latter is removed, for example by an acid treatment. The carbon monoliths obtained according to the method described by Alvarez S. et al. comprise a macroporous network which is the positive replica of the macroporous network of the silica template used and a mesoporous network which corresponds to the negative of the mesoporous network of the silica template used.

There currently exists no hard-templating process which allows access to materials comprising a hierarchical porous network comprising a macroporous network, which is the exact replica of the macroporous network of the silica template used, and a microporous network, while being devoid of a mesoporous network.

Objets and Summary

In point of fact, it is advantageous to be able to have available materials of this type, insofar as the presence of a macroporous network makes it possible to improve the impregnation of a fluid, such as a reactant, within the material. Furthermore, it is advantageous to be able to have available a material exhibiting a degree of microporosity as this increases the specific surface of the material and improves the gas-phase confinement reactions (makes possible storage of hydrogen in the gas phase, for example). On the other hand, the presence of a mesoporous network in a material additionally comprising a macroporous network is not always desirable as this would have the consequence of weakening the texture of the walls and properties of the material in its entirety. In addition, it has recently been demonstrated that the presence of a mesoporous network is not necessary for high-performance heterogeneous catalysts to be obtained (Ungureanu S. at al., Chem. Mater., 2008, 20, 6464-6500).

The aim of the present invention is to provide preparation process which makes possible access, starting from a solid matrix, to porous carbon or ceramic monoliths comprising a hierarchical porous network comprising macropores, the diameter of which is equal to at least 1 μm, and interconnected micropores and in which the macroporous network is the substantially exact replica of the macroporous network of the solid matrix used, said monoliths not comprising a mesoporous network.

A subject matter of the present invention is a process for the preparation of a cellular carbon or ceramic monolith comprising a hierarchical porous network comprising, interconnected macropores and micropores, said porous network being devoid of mesopores, characterized in that it comprises at least the following stages:

1) a stage of preparation of a solid silica template in the form of a cellular monolith composed of a matrix formed of silica or of organically modified silica, said monolith comprising macropores having a mean dimension $d_A$, of 0.1 μm to 1.00 μm, mesopores having a mean dimension $d_E$ of 2 to 50 nm and micropores having a mean dimension $d_I$ of 0.7 to 1.5 nm, said pores being interconnected;

2) a stage of impregnation, under vacuum, of the solid silica template with a solution of at least one carbon precursor or of at least one ceramic precursor chosen from preceramic polymers resulting in oxycarbonitrides, carbonitrides, nitrides or boronitrides of carbon;

3) a stage of polymerization and/or of crosslinking of said precursor within the solid silica template;

4) a stage of carbonization of the solid silica template including said polymerized and/or crosslinked precursor;

5) the production of said carbon or ceramic monolith by removal, of the solid silica template by treatment with an acid or a base, said treatment being carried out without distinction before or after said carbonization stage;

and in that, during the first stage, the silica template is prepared according to a process consisting:
 in preparing an emulsion by introducing an oily phase into an aqueous solution of surfactant,
 in adding an aqueous solution of at least one silicon oxide precursor and/or of at least one organically modified silicon oxide precursor to the surfactant solution, before or after the preparation of the emulsion,
 in leaving the reaction mixture standing until said precursor has condensed, then
 in drying the mixture in order to obtain the expected solid silica template, and
 when the silica template is prepared from an aqueous solution of at least one (not organically modified) silicon oxide precursor, then said process furthermore comprises an additional stage consisting in thermally treating the solid silica template at a temperature of at least 650° C. (sintering stage which makes it possible to weld the silica particles in order to enhance the mechanical properties of the template).

Within the meaning of the present invention, the term "mesoporous network." is understood to mean a network comprising mesopores, that is to say pores having a size varying from 2 to 50 nm.

This is because the inventors have found that the use of a solid silica template comprising a triple porosity as defined above makes it possible to obtain, not a carbon or ceramic monolith having a macroporous network corresponding to the negative of the macroporous network of the template used (solid carbon or ceramic spheres placed next to one another) or a macro/mesoporous monolith having a macroporous network which is the replica of the macroporous network of the template used and having a mesoporous network corresponding to the negative of the mesoporous network of the template used, but a carbon or ceramic monolith comprising, very surprisingly, a homogeneous and hierarchical M2 porous network in which the macroporous network is composed of hollow carbon or ceramic spheres placed next to one another which is the substantially exact replica of the macroporous network of the silica template used and which has wails which are microporous. Furthermore, the monolith thus obtained is devoid of mesoporosity.

Within such materials, the thickness of the walls of the macropores (internal junctions) is particularly homogeneous.

The homogeneity of the impregnation and the excellent mechanical properties of the materials obtained attest to the unexpected nature of this result: this is because, when use is made of a silica template provided in the form of a macroporous material, the virtual absence of forces of capillary attraction and the confinement (the wetting of the carbon or ceramic precursor with the silicic interface) are not characteristics which can generate, a priori:
 good covering of the macropores of the silica template, this being all the more true over several millimeters (from the outside towards the inside of the monolith);
 and thus an open macroporosity.

Within the meaning of the present invention, the term "monolith" is understood to mean a solid object having a mean dimension of at least 1 mm.

The silicon oxide or organically modified silicon oxide precursor(s) used during the first stage of preparation of the silica template can be chosen from silicon tetraalkoxides of following formula $$R'_n(OR)_{4-n}Si \qquad (I)$$

in which:
R represents an alkyl radical having from 1 to 5 carbon atoms or a group of following formula (II):

$$—(CH_2)_m—R_1 \qquad (II)$$

in which $0 \leq m \leq 5$ and $R_1$ is chosen from a thiol group, a pyrrole group, an amino group which optionally carries one or more alkyl, amino-alkyl or optionally substituted aryl substituents, an alkyl group (preferably having from 1 to 5 carbon atoms) or a phenyl group which optionally carries a substituent $R_2$ of alkyl type, in particular a methyl group,
R' represents an alkyl radical having from 1 to 5 carbon atoms or an aryl radical which optionally carries one or more functional groups, and
$0 \leq n \leq m$; m being the valency of the silicon atom.

In one embodiment, the precursor of formula (I) comprises just one type of group of formula (II). In another embodiment, the precursor of formula (I) comprises at least two different types of groups of formula (II).

In particular, the organic group of formula (II) can be:
a 3-mercaptopropyl group;
a 3-aminopropyl group;
a 3-(N-pyrrolyl)propyl group;
a 3-(N-(2-aminoethyl)amino)propyl group;
a 3-(2,4-dinitrophenylamino)propyl group;
a phenyl or benzyl group; or
a methyl group.

According to a preferred embodiment of the invention, the precursor (s) of formula (I) are chosen from tetramethoxysilane, tetraethoxyorthosilane (TEOS), (3-mercaptopropyl)trimethoxysilane, (3-aminopropyl)triethoxysilane, N-(3-trimethoxysilylpropyl)pyrrole, 3-(2,4-dinitrophenylamino) propyltriethoxysilane, (3-(N-(2-aminoethyl)amino)propyl) trimethoxysilane, phenyltriethoxysilane and methyltriethoxysilane.

The use of a precursor of formula (I) comprising at least one group of formula (II) makes it possible to obtain a silica template in which the wetting with the solution of carbon or ceramic precursors is improved. This also makes it possible to optimize the impregnation of the porosity with polymerizable monomers or with macromonomers which will give rise to the carbon and to various ceramics.

The use of a precursor of formula (I) comprising at least one complexing group of formula (II), such as, for example, a 3-mercaptopropyl, 3-aminopropyl, 3-(N-pyrrolyl)propyl, 3-(N-(2-aminoethyl)amino)propyl or 3-(2,4-dinitrophenylamino)propyl group, makes it possible in addition to trap varied metals as a function of the nature of the group of formula (II). In this case, the process in accordance with the invention then additionally comprises, before stage 2), an intermediate stage during which the silica template is impregnated with a solution of at least one metal salt. During this impregnation, either the metal salt is complexed in this state by the group of formula (II) or the cation of the metal salt is complexed in the reduced form. In this case, the reduction of the metal cation can be brought about either by subsequent impregnation of the silica template with a solution of a reducing agent, such as, for example, sodium borohydride, or by radiolysis, that is to say by irradiation of the silica template with gamma rays. The carbon or ceramic monolith finally obtained will thus incorporate, in its structure, the metal or metals used.

The concentration of silicon oxide precursor (s) and/or of organically modified silicon oxide precursor (s) within the aqueous solution is preferably greater than 10% by weight, with respect to the weight of the aqueous phase. This concentration more preferably varies from 17 to 35% by weight, with respect to the weight of the aqueous phase.

The oily phase is preferably composed of one or more compounds chosen from linear or branched alkanes having at least 12 carbon atoms. Mention may be made, by way of example, of dodecane and hexadecane. The oily phase can in addition be composed of a silicone oil of low viscosity, that is to say of less than 400 centipoises.

The amount of oily phase present within the emulsion can be adjusted as a function of the diameter of the macropores which it is desired to obtain for the silica template, it being understood that the greater the oil/water fraction by volume, the smaller the diameter of the oil droplet within the emulsion and also the smaller the diameter of the macropores.

Generally, the oily phase represents from 60 to 90% by volume, with respect to the total volume of the emulsion. This amount of oil makes it possible to obtain a silica template in which the mean diameter of the macropores varies from 1 to 100 μm approximately.

The surface-active compound can be a cationic surfactant chosen in particular from tetradecyl-trimethylammonium bromide (TTAB), dodecyltriethylammonium bromide or cetyltrimethylammonium bromide. When the surface-active compound is cationic, the reaction medium is brought to a pH of less than 3, preferably of less than 1. Tetradecyltrimethylammonium bromide is particularly preferred.

The surface-active compound can in addition be an anionic surfactant chosen from sodium dodecyl sulfate, sodium dodecylsulfonate and dioctyl sodium sulfa-succinate (AOT). When the surface-active compound is anionic, the reaction medium is brought to a pH of greater than 10.

Finally, the surface-active compound can be a nonionic surfactant chosen from surfactants comprising an ethoxylated head and from nonylphenols. Mention may in particular be made, among such surfactants, of ethylene glycol and propylene glycol block copolymers, sold, for example, under the trade names Pluronic® P123 and Pluronic® F127 by BASF. When the surface-active compound is nonionic, the reaction medium is brought to a pH of greater than 10 or less than 3, preferably less than 1, and, in addition, preferably comprises sodium fluoride in order to improve the condensation of the silicon oxide precursors.

The total amount of surfactant present within the emulsion can also be adjusted as a function of the diameter of the macropores which it is desired to obtain in the silica template. This amount can also be varied as a function of the nature of the surfactant used.

Generally, the amount of surfactant varies from 1 to 10% by weight, preferably from 3 to 6% by weight, with respect to the total weight of the emulsion.

The stage of condensation of the silicon oxide precursor(s) and/or of the organically modified silicon oxide precursor (s) is advantageously carried out at a temperature close to ambient temperature. The duration of this stage can vary from a few hours (2 to 3 hours) to a few weeks (2 to 3 weeks) as a function of the pH of the reaction medium.

According to a preferred embodiment of the invention, the silica template obtained at the end of the first stage is washed using an organic solvent (such as, for example, tetrahydrofuran, acetone and their mixtures) and then dried (for example, with air in an oven or by lyophilization), before being subjected to the stage of impregnation with the solution of carbon precursor or of ceramic precursor.

The carbon precursor (s) are preferably chosen from phenolic resins, resorcinols, styrene, divinylbenzene, polysaccharides, such as, for example, sucrose and its derivatives, potato starch, lignin, lignin/cellulose mixtures and petroleum pitches.

The ceramic precursor(s) are chosen from preceramic polymers resulting in oxycarbonitrides or in carbonitrides, nitrides or boronitrides of carbon which are optionally metallic, among which may in particular be mentioned polyaminoborazines and their derivatives and polycarbazides and their derivatives.

The carbon precursors can be provided in the form of monomers, of oligomers, of preformed macromonomers or of polymers which are polymerized and/or crosslinked during stage 3). When a petroleum pitch is used as carbon precursor, stage 3) is not necessarily carried out.

According to a preferred embodiment of the invention, the process is carried out in order to prepare a carbon monolith and the precursor of the impregnation solution is a carbon precursor and more preferably still a phenolic resin, in particular a phenol/formaldehyde resin.

The solvent of the solution of carbon precursor or of ceramic precursor is preferably an organic solvent chosen from lower alcohols, such as ethanol, tetra-hydrofuran (THF), toluene and their mixtures. When the carbon precursor is chosen from phenolic resins, the solvent can also be chosen from water and mixtures of water with at least one organic solvent chosen from the abovementioned solvents, in the presence of a base.

The amount of carbon precursor or of ceramic precursor in the solution used for the impregnation stage can be adjusted as a function of the diameter of the macropores which it is desired to obtain in the carbon or ceramic monoliths on conclusion of the process, it being understood that the lower this amount, the greater the diameter of the macropores and the finer the internal junctions (walls of the macropores). Generally, the amount of carbon precursor or of ceramic precursor within the impregnation solution varies from 5 to 90% by weight and more preferably still from 20 to 70% by weight, with respect to the total weight of said solution.

Stage 3) of polymerizing and/or crosslinking the carbon or ceramic precursor (5) can be carried out by any method known to a person skilled in the art.

When the precursor is a carbon precursor, such as, for example, a phenolic resin, a thermocrosslinking is carried out.

When the precursor is a carbon precursor, such as, for example, styrene or divinylbenzene, a crosslinking is carried out which is induced by a crosslinking agent chosen in particular from azo(bis)isobutyronitrile (AIBN), potassium peroxodisulfate and sodium peroxodisulfate.

When the precursor is a ceramic precursor, a polymerization followed by a crosslinking are carried out, it being possible for these two operations to be induced thermally or photochemically.

The stage of carbonization of the silica template impregnated with polymerized and/or crosslinked carbon or ceramic precursor is generally carried out under a reducing atmosphere, at a temperature varying from 500 to 1200° C. approximately, for a period of time of 3 to 12 hours approximately.

When the carbonization stage is carried out at a temperature of less than or equal to 600-700° C. approximately, the carbon or ceramic monolith obtained on conclusion of the process exhibits an electronically nonconducting amorphous structure.

When the carbonization stage is carried out at a temperature of greater than 600-700° C. approximately (pyrolysis), the carbon or ceramic monolith obtained exhibits a semigraphitized structure which confers semiconducting electronic properties on it.

As indicated above, the stage of removal of the silica template can be carried out without distinction before or after the carbonization stage, this being because the order in which these two stages are carried out has no effect on the structure of the porous network of the resulting monolith.

This stage of removal of the silica template is preferably carried out by immersion of the silica template, impregnated with polymerized and/or cross-linked precursor, or of the carbon or ceramic monolith resulting from the carbonization in a solution of an acid, such as, for example, a hydrofluoric acid solution, or in a basic solution having a pH of greater than 9, such as, for example, in a sodium hydroxide or potassium hydroxide solution. The duration of this treatment is not critical from the moment at which it results in the complete removal of the silica template. This duration generally varies from 12 to 24 hours.

The carbon or ceramic monolith according to the invention, capable of being obtained by the implementation of the process as defined above, is novel per se and constitutes, as such, another subject matter of the invention.

Another subject matter of the invention is thus a cellular solid material provided in the form of a porous carbon or ceramic monolith, characterized in that said material comprises a hierarchical porous network composed of interconnected macropores and micropores, in which network:

i) the macropores have a mean dimension $d_A$ of 1 μm to 100 μm approximately, preferably of 4 to 70 μm approximately, and have walls having a thickness of 0.5 to 40 μm, and ii) the micropores have a mean dimension $d_I$ of 0.7 to 1.5 nm, and in that said material is devoid, of mesoporous network.

In this material, the wails of the macropores preferably have a thickness of 2 to 25 μm.

According to the invention, the micropores are present in the thickness of the walls of the macropores, thus rendering them microporous.

The specific surface of the material according to the invention is generally from 400 to 900 $m^2/g$ approximately, preferably from 500 to 700 $m^2/g$ approximately.

The material in accordance with the invention can exhibit a noncrystalline amorphous structure or a semigraphatized structure. When the structure is amorphous, said material is electrically nonconducting, whereas, when the structure is semigraphatized, the material, is electrically semiconducting. In the latter case, the conductivity of such a material can vary from 2 to 20 $S \cdot cm^{-1}$.

In addition, such a material has excellent mechanical properties: Young's modulus of $2 \times 10^{-3}$ to 0.2 GPa (preferably 0.2 GPa approximately) and a strength of 1 to 13 J/g approximately (preferably 13 J/g approximately).

The material in accordance with the present invention can be used in various industrial applications, such as, for example, in the manufacture of hydrogen storage devices, of supercapacitors or of electrodes, such as, for example, of negative electrodes in lithium batteries or of macroporous conducting electrodes which can be used in electrocatalysis; in carrying out chemical reactions catalyzed in a heterogeneous phase or in the manufacture of enzymatic sensors or biofuel cells, that is to say of cells in which the cathode and the anode are made from the cellular material in accordance with the invention. This is because the good mechanical properties of the material and its electrically conducting properties, if appropriate, allow the manufacture of electrodes of varied shapes.

The conducting nature of the material results in a relaxation in the electron density, which enhances its catalytic properties.

DETAILED DESCRIPTION

The present invention is illustrated by the following implementational examples, to which, however, it is not limited.

EXAMPLES

The starting materials used in the examples which follow are list below:
  98% tetradecyltrimethylammonium bromide (Tri): Alfa Aesar;
  98% tetraethoxyorthosilane (TEOS): Aldrich;
  99% dodecane and acetone: Rectapur;
  tetrahydrofuran (THF); 48% hydrofluoric acrd and 37% hydrochloric acid: Analar Normapur;
  phenol/formaldehyde resin, sold in the form of an aqueous/alcoholic solution of prepolymers under the name Ablaphene® RS 101 by Rhodia.

These starting materials were used as received from the manufacturers, without additional purification.

The various monoliths obtained in the examples were characterized over various scales of sizes.

The mesoporosity was characterized qualitatively by a transmission electron microscopy (TEM) technique using a Jeol 2000 FX microscope having an accelerating voltage of 200 kV. The samples were prepared by depositing powdered silica skeletons on a copper grid coated with a Formvar@ carbon membrane.

The macroporosity was characterized qualitatively by a scanning electron microscopy (SEM) technique using a Jeol JSM-84021 scanning microscope which operates at 10 kV. The samples were coated with gold or carbon before their characterization.

The specific surface measurements were carried out by nitrogen adsorption/desorption techniques using a device sold under she name Micromeritics ASAP 2010; the interpretation being carried out by the BET or BJH calculation methods.

The macroporosity was quantified by mercury intrusion measurements using a device sold under the name Micromeritics Autopore IV, in order to arrive at the characteristics of the macroscopic inorganic cells of which the inorganic skeleton is composed.

The samples were subjected to analysis by X-ray diffraction (XRD) or by small-angle X-ray diffraction (SAXS) using an 18 kW rotating anode X-ray source (Rigaku-200) employing a Ge crystal (111) as monochromator. The scattered radiation was collected on a two-dimensional collector (Imaging Plate system, sold by Mar Research, Hamburg). The distance from the detector to the sample was 500 mm.

Thermogravimetric analyses were carried out under an oxygen stream (5 $cm^3 \cdot min^{-1}$) using a thermogravimetric analyzer sold under the name Stearam TAG-1750.

Fourier transform infrared spectroscopy (FTIR) analyses were carried out on a spectrometer sold under the name Nicolet 750.

Mechanical compression tests were carried out on the materials using a device sold under the name Instron 4466. The samples were compressed between two rigid plates and the mechanical strains observed at different pressures were recorded. The rate of compression was 0.5 mm/s.

Example 1

Preparation of Macro- and Microporous Carbon Monoliths

In this example, the preparation of various carbon monoliths exhibiting a double macro/micro porosity starting from a micro/meso/macroporous silica monolith is illustrated.

1) First Stage: Synthesis of a Micro/Meso/Macroporous Silica Monolith (MSi)

5 g of TEOS were added to 16 g of a 35% aqueous solution of TTAB acidified beforehand with 7 g of HCl, Hydrolysis was allowed to take place until a single-phase hydrophilic medium was obtained (aqueous phase of the emulsion). 35 g of dodecane (oily phase of the emulsion) were subsequently added, dropwise and with stirring, to this aqueous phase. The emulsion was subsequently left to condense in the form of a silica monolith for a week at ambient temperature. The silica monolith thus synthesized was subsequently washed with a THF/acetone (50/50:v/v) mixture in order to extract the oily phase therefrom. The silica monolith was then dried for a week at ambient temperature and then it was subjected to a heat treatment at 650° C. for 6 hours, a rate of rise in temperature of 2"C/min being applied, with a plateau at 200° C. for 2 hours. A silica monolith was obtained which was designated MSi.

2) Second Stage: Impregnation of the Silica Monolith with the Phenolic Resin

The silica monolith MSi obtained above was cut into 5 identical pieces, each of 0.5 q, using a hand saw.

Furthermore, the following four solutions of Ablaphene®RS 110 phenolic resin were prepared:

Solution S25: Ablaphenee® RS 110 at 25% by weight in THF,

Solution S60: Ablaphenee® RS 110 at 60% by weight in THF,

Solution S80: Ablaphenee® RS 110 at 80% by weight in THF,

Solution S90: Ablaphenee® RS 110 at 90% by weight in THF.

A 0.5 g piece of silica monolith was subsequently immersed in each of the solutions S25 to S90 in a beaker. The beakers were placed under vacuum until the effervescence had disappeared, in order to ensure good impregnation of the silica matrices by the phenolic resin solutions. After stirring at ambient temperature for 24 hours, each of the solutions was filtered.

The silica monoliths thus impregnated with the solutions 525 to S90, respectively MSiS25, MSiS60, MSiS80 and MSiS90, were then quickly washed with THF and then dried in an oven at a temperature of 80° C. for 24 hours in order to facilitate the evaporation of the solvent and to thermally initiate the crosslinking of the monomers of the phenolic resin. Each of the monoliths MSiS25 to MSiS90 was subsequently subjected to a second heat treatment in a hot-air oven at 155° C. for 5 hours, with a rate of rise in the temperature of 2"C/rain, a first plateau at 80° C. being produced for 12 hours and then a second plateau at 110° C. being produced for 3 hours. The monoliths were subsequently allowed to return to ambient temperature by simply switching off the oven. Silica monoliths impregnated with a crosslinked phenolic resin (hybrid monoliths of MSiScross type) were thus obtained. These monoliths are respectively denoted MSiS25cross, MSiS60cross, MSiS80cross and MSiS90cross. The MSiS80cross monolith was prepared in duplicate.

3) Third Stage: Synthesis of the Carbon Monoliths

Two synthetic routes were employed.

According to the first synthetic route, each of the monoliths MSiS25cross, MSiS60cross, MSiS80cross and MSiS90cross as obtained above on conclusion of the second stage was immersed in three successive baths of 10% hydrofluoric acid and then copiously washed with deionized water. This treatment with hydrofluoric acid resulted in the removal of the silica template. The monoliths resulting from this treatment were subsequently dried in a hot-air oven at 80° C. overnight. After drying, the monoliths were subjected to pyrolysis at a temperature of 900° C. for 1 hour under a nitrogen stream while observing a rate of rise in temperature of 41° C./min. The graphitized carbon monoliths thus obtained are respectively denoted MS25-carb, MS60-carb, MS80-carb and MS90-carb.

The second synthetic route was applied to the other monolith MSiS80cross. According to this second route, the order in which the treatment with hydrofluoric acid and the pyrolysis were carried out was simply reversed, each of these two stages nevertheless being carried out in an identical fashion to the procedure used to produce the MScarb monoliths. The graphitized carbon monolith thus obtained was referred to as MS80HF.

4) Characterizations

Figure 1:
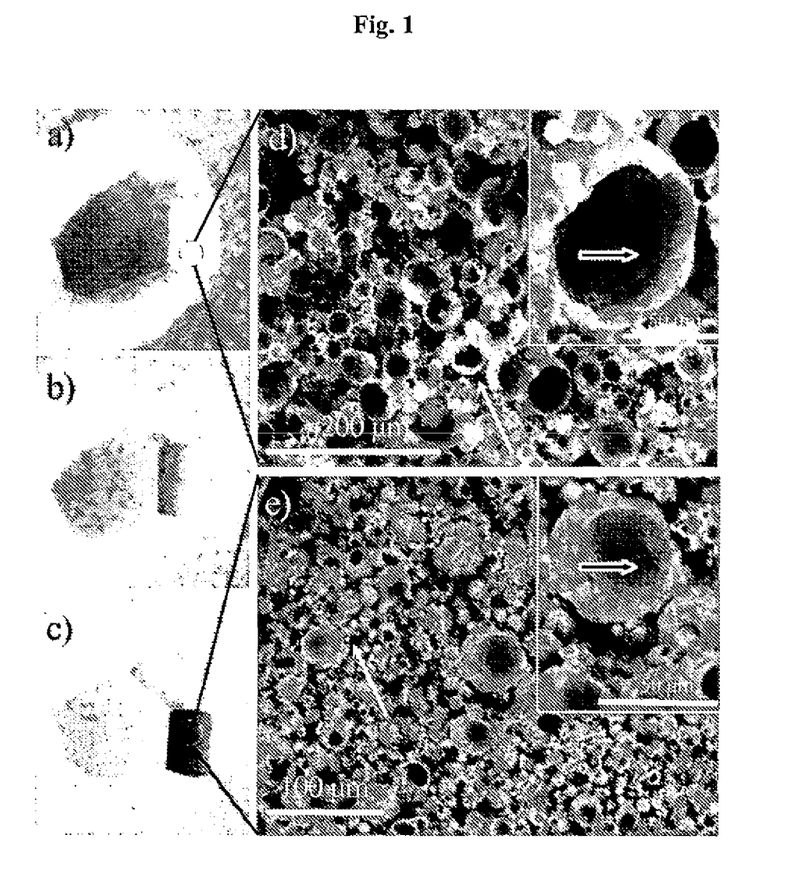
FIG. 1(a)-1(e) show macroscopic views of the monoliths obtained on conclusion of each of the three stages of the process in accordance with one embodiment.

The appended FIG. 1 shows macroscopic views of the monoliths obtained on conclusion of each of the three stages of the process: FIG. 1a) corresponds to a monolith of MSi type; FIG. 1b) corresponds to a monolith of MSiScross type and FIG. 1c) corresponds to a carbon monolith of MS80HF type.

It is found that the general shape of the silica monolith used as template is reproduced exactly by the carbon monolith via the hybrid monolith of MSiScross type. A loss in volume of approximately 45% between the silica monolith and the corresponding carbon monolith is also observed; this loss in volume is due to a type of settling of the material brought about by the removal of the silica template during the pyrolysis.

The appended. FIG. 1 also shows a microscopic SEM view of the macroscopic porous network of a monolith of MSi type (FIG. 1d) and of the carbon monolith of MS80HE type. In these figures, the white arrows indicate the external junctions of the pores and the black arrows on a white background indicate the internal junctions of the pores.

It is observed that the structure of the macroporous network of the silica monolith is retained in the corresponding carbon monolith, indicating that the latter is indeed the substantially exact replica of the silica template used and not its negative.

The results of the mercury intrusion measurements carried out on each of the carbon monoliths synthesized in this example are given in the appended FIG. 2 and are collated in table 1 below.

Figure 2:
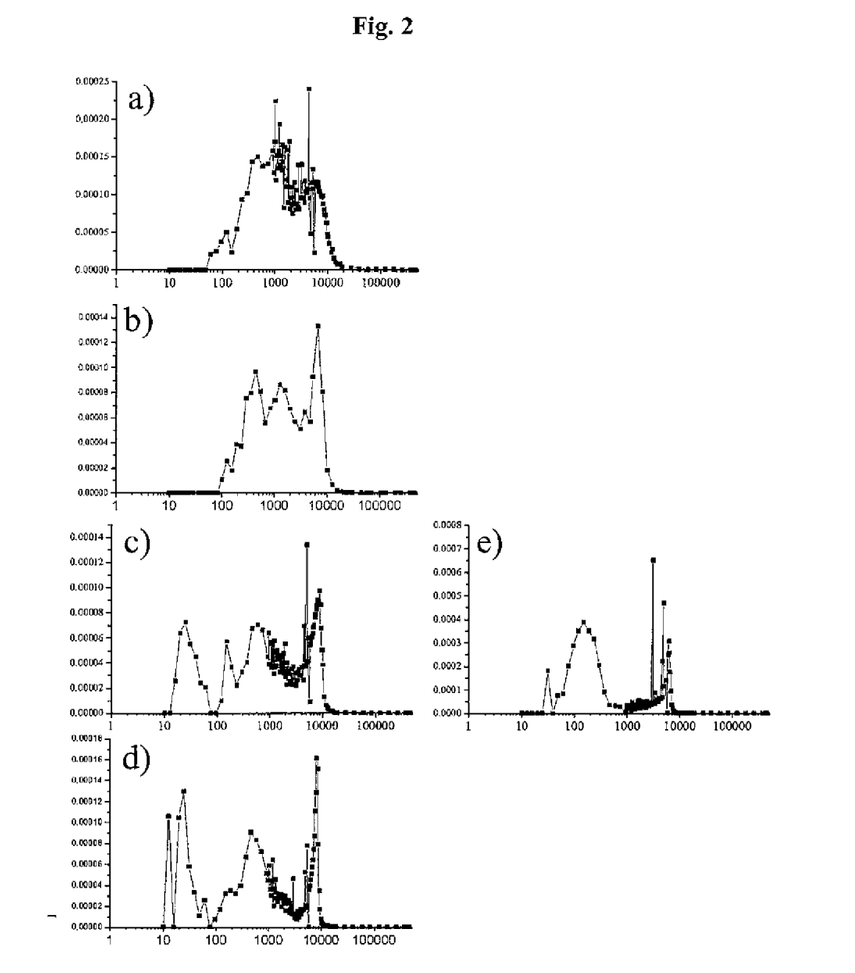
FIG. 2(a)-2(e) show the results of the mercury intrusion measurements carried out on each of the carbon monoliths synthesized in accordance with one example.

In FIG. 2, the curves 2a) to 2e) represent the differential intrusion volume (in ml/q/nm) as a function of the pore diameter (in nm) for each of the carbon monoliths (FIG. 2a): MS25carb; FIG. 2b): MS60-carb; FIG. 2c) MS80-carb; FIG. 2d): MS90-carb; and FIG. 2e): MS80HF).

TABLE I

| Monoliths | MS25carb | MS60carb | MS80carb | MS80HF | MS90carb |
|---|---|---|---|---|---|
| Intrusion volume (cm³·g⁻¹) | 1.4 | 1.0 | 0.6 | 0.7 | 0.5 |
| Porosity (%) | 71 | 58 | 51 | 48 | 42 |
| Bulk density (g·cm³) | 0.5 | 0.6 | 0.8 | 0.7 | 0.9 |
| Density of the skeleton (g·cm³) | 1.7 | 1.5 | 1.6 | 1.4 | 1.5 |

These results show that the volume of the macroporous network is inversely proportional to the concentration of the phenol/formaldehyde resin used to impregnate the MSi monolith (decrease in the intrusion volume and in the porosity percentage when going from MS25-carb to MS90-carb). The diameter of the macropores is polydispersed and varies from 10 to 10 000 nm (FIG. 2).

N.B.: The mercury impregnation measurements are only valid within the range of the macropores. The few points which appear in the region of diameters of between 2 and 50 nm in FIGS. 2c and 2d in particular are measurement artifacts or point defects of the materials but do not under any circumstances correspond to the presence of a mesoporous network. Furthermore, the absence of mesoporous network has been confirmed by nitrogen adsorption/desorption measurements (see table 2 and findings from table 2 below).

The final density of the carbon skeleton of each of the monoliths is, on the other hand, substantially identical in each of the cases, owing to the fact that the skeleton is composed exclusively of partially graphitized carbon.

The results obtained with MS80-carb and MS80HF are not significantly different, which demonstrates that the two synthetic routes used during the stage 3) of carbonization are equivalent.

Figure 3:
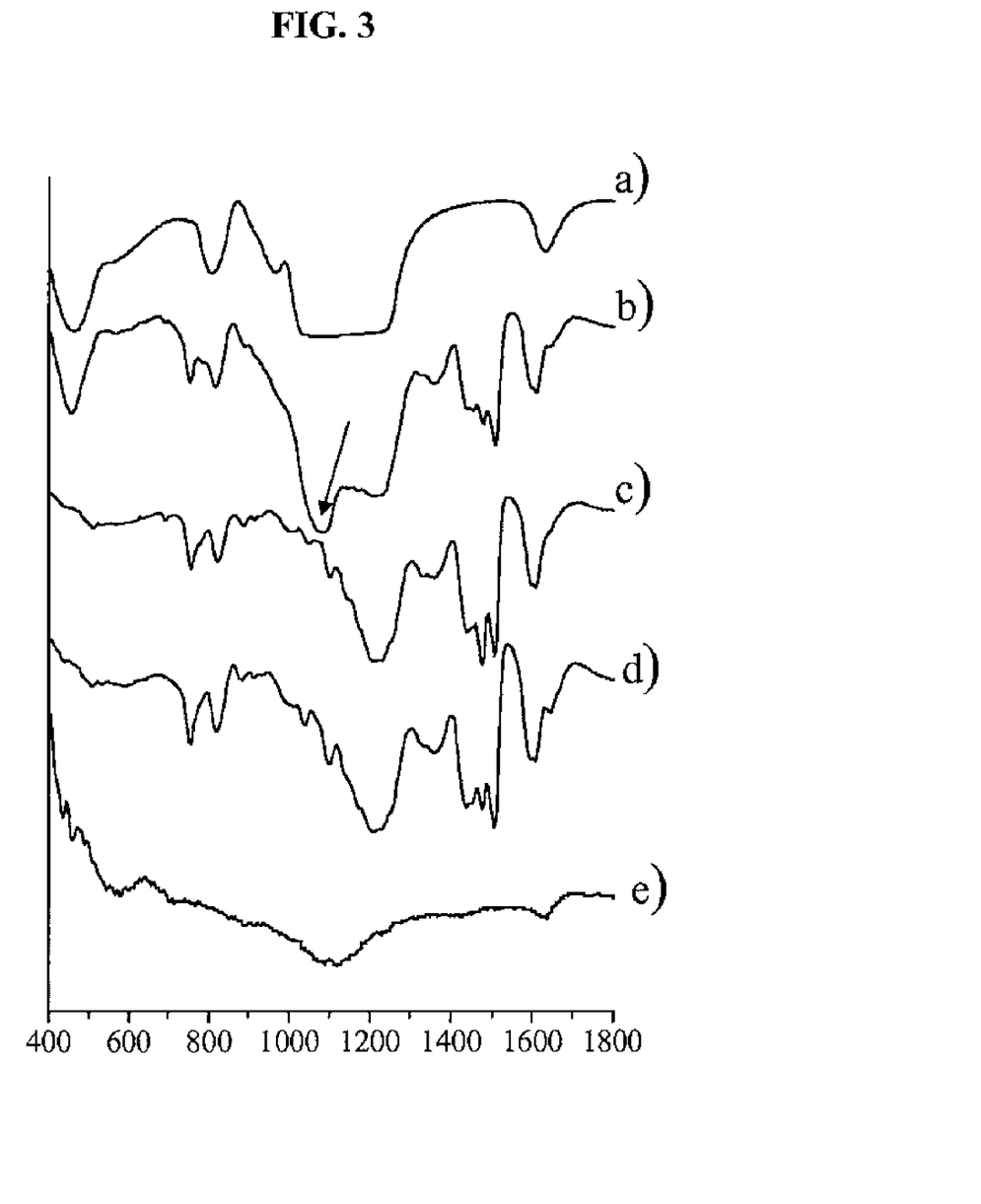
FIG. 3 shows an FTIR spectra in accordance with one embodiment.

It has also been confirmed, by Fourier transform infrared spectroscopy, that the treatment with hydrofluoric acid carried out during the third stage makes it possible to remove the silica template. The appended FIG. 3 represents the FTIR spectra obtained with the MSi silica template (FIG. 3a)), a silica matrix after impregnation with and crosslinking of a solution of phenol/formaldehyde resin: MSiScross (FIG. 3b)), a silica matrix of MSiScross type which has been subjected to a treatment with hydrofluoric acid but not to carbonization (FIG. 3c)), a crosslinked phenol/formaldehyde resin matrix obtained by simple crosslinking by heat treatment of 1 ml of Ablaphene® RS 101 phenol/formaldehyde resin in a glass sample tube (FIG. 3d)) and a carbon monolith MScarb (FIG. 3e)). In this FIG. 3, the transmission, expressed in arbitrary units, is a function of the wavelength, expressed in cm⁻¹. The black arrow indicates the peak characteristic of Si—O at 1076 cm⁻¹. The spectra 3a) and 3b) of the monoliths MSi and MSiScross both exhibit a strong absorption centered at 1076 cm⁻¹, signifying the presence of silica. In the spectrum 3d) corresponding to the pure phenol/formaldehyde resin matrix, this peak is, of course, absent, as is the case also with regard to the spectra 3c) and 3e). These results demonstrate that the silica template has been completely removed by the treatment with hydrofluoric acid. The spectrum of the carbon monolith MScarb is fairly flat; the peaks corresponding to the sp² and sp³ orbitals of the aromatic rings are situated respectively at approximately 1650 cm⁻¹ and 1100 cm⁻¹.

The specific surface measurements for each of the carbon monoliths obtained are collated in table 2 below:

TABLE 2

| Monoliths | MS25carb | MS60carb | MS80carb | MS80HF | MS90carb |
|---|---|---|---|---|---|
| Specific surface by BET (m²·g⁻¹) | 550 | 700 | 460 | 400 | 450 |
| Specific surface by BJH (m²·g⁻¹)ᵃ | — | 12 | 11 | 2 | 5 |
| Total pore volume (cm³·gm⁻¹) | 0.25 | 0.24 | 0.23 | 0.20 | 0.22 |

ᵃthe BJH method has been applied solely to the pores having a diameter of greater than 17 Å and for the desorption curve It can be concluded, from these results, that the monoliths have a microporous nature (pore size of between 7 and 12 Å) and do not exhibit mesoporosity.

Figure 4:
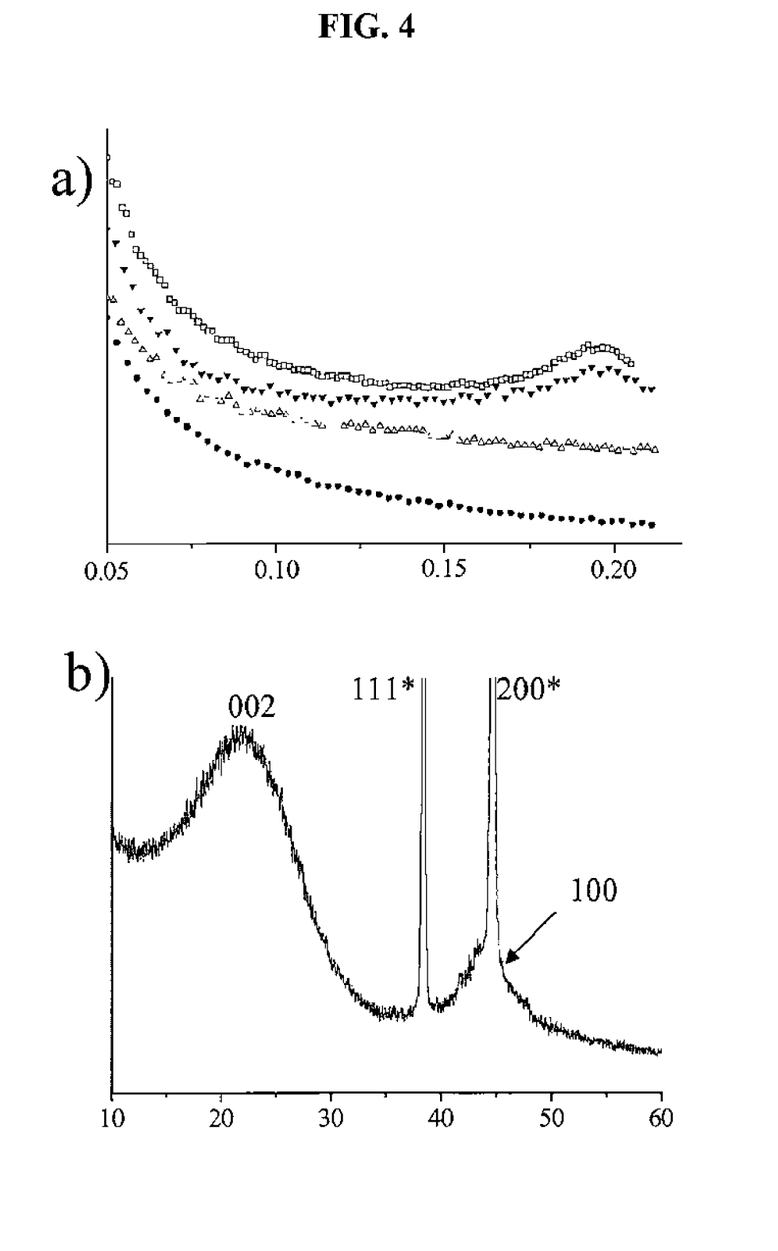
FIG. 4a is a study of the porosity on the mesoscopic scale evaluated by SAXS in accordance with one embodiment.
FIG. 4b is an XRD diffraction spectrum of a carbon monolith of MS80HF type in accordance with one embodiment.

The study of the porosity on the mesoscopic scale evaluated by SAXS is given in the appended FIG. 4a). The scattering profiles were established for each of the carbon monoliths synthesized (MSi: □, MSiS80cross: ▼, MS80-carb: Δ, and MS80HF: •). In this figure, the intensity, expressed in arbitrary units, is a function of the wave vector (q), expressed in Å⁻¹.

It is found that the matrices formed of pure silica MSi and of silica impregnated with crosslinked resin MSiScross have an unordered mesoporosity with a distance between two pores of 32 Å (wave vector q 0.195 Å⁻¹). Furthermore, an absence of mesoporosity is observed in the other monoliths.

When FIG. 4b), which represents the XRD diffraction spectrum of a carbon monolith of MS80HF type (intensity, in arbitrary units, as a function of the diffraction angle, in degrees), is considered, two main peaks (2Q=22° and 2Q=45°) are observed which correspond respectively to the peaks characteristic of the graphitized carbonaceous compounds (d(002)=0.4 nm and d(100)/d(101)).

The carbon monoliths of MScarb and MS80HF type thus graphitized exhibited a conductivity of the order of $10 S \cdot cm^{-1}$.

Figure 5:
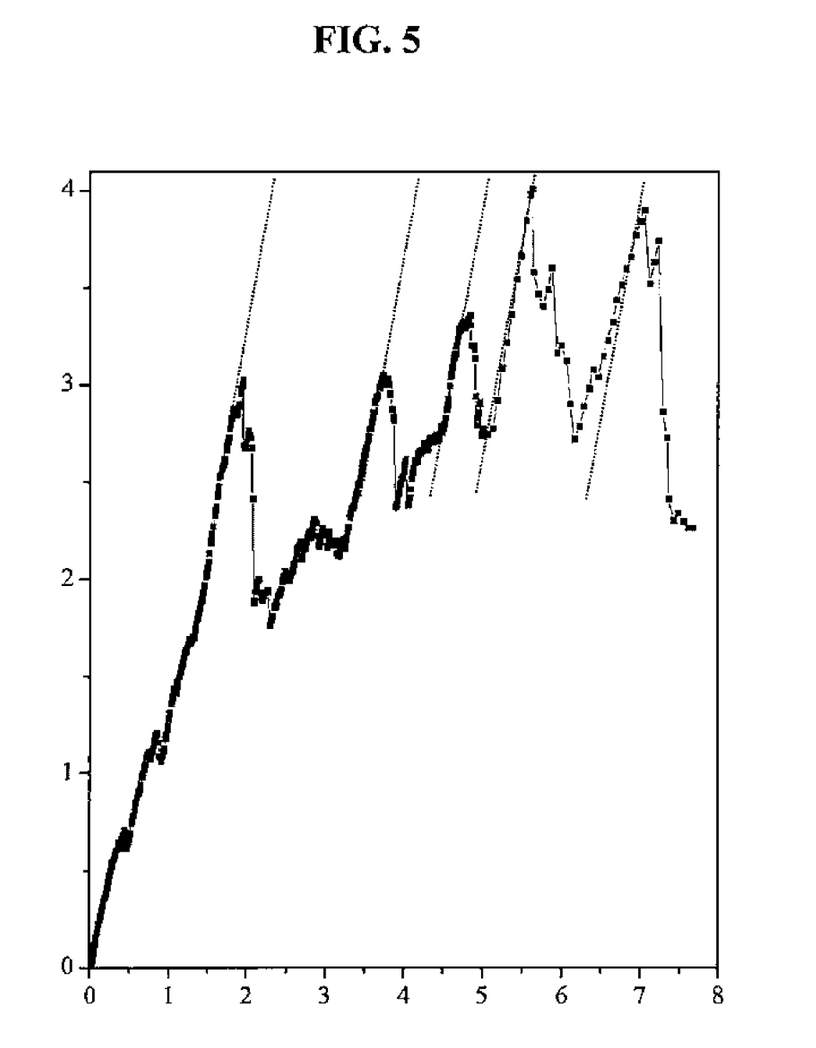
FIG. 5 shows the results of the mechanical compression tests carried out on the carbon monolith MS80HF in accordance with one embodiment.

The results of the mechanical compression tests carried out on the carbon monolith MS80HF are given by the appended FIG. 5, in which the stress (in MPa) is a function of the strain (in %). The lagged curve reveals abrupt falls in the stress which are due to a partial rupture of the macroporous structure of the monolith (rupture of the wall of the macropores) in this figure, the oblique dotted lines demonstrate that each pinnacle begins with the same slope, whatever the value of the stress applied. This result is revealing of behavior under elastic conditions.

The mean Young's moduli calculated from these results are of the order of 0.2 GPa and reflect the very high strength of the materials obtained, allowing them to be used, for example, in the manufacture of hydrogen purifiers, of supercapacitors or of electrodes, in particular of anodes in lithium batteries or alternatively of electrodes modified by specific enzymes for biological sensors.

Example 2

Preparation of an Enzymatic Sensor

In this example, an illustration is given of the preparation of an enzymatic sensor (ES) for the detection of glucose, starting from a carbon monolith and from a bioelectrocatalyst comprising glucose oxidase and its redox polymer polyacrylamide-poly(N-vinylimidazole)-[Os(4,4'-dichloro-2,2'-bipyridine)$_2$Cl]$^{+/2+}$, also known as polyvinylpyridine-[Os(N' N'-dialkylated-2,2'-biimidazole)$_3$]$^{2+/3+}$(PVP—[Os (N',N'-dialkylated-2,2'-biimidazole)$_3$]$^{2+/3+}$).

The carbon monolith used in this example was prepared exactly as described above in example 1 except that use was made, for the stage of impregnation of the silica template as obtained in stage 1) of example 1, of a 40% phenolic resin solution, i.e. a solution S40: Ablaphene®RS 110 at 40% by weight in THF.

A silica monolith impregnated with the solution 540 was obtained, i.e. an MSiS40 monolith.

The carbon monolith was then synthesized according to the first synthetic route described above in stage 3) of example 1.

A carbon monolith MS40-carb was obtained, the porosity characteristics of which were as follows:

Mesoporosity (nitrogen adsorption/desorption):
    Specific surface of the micropores: 523 $m^2 \cdot g^{-1}$
    Micropore volume: 0.27 $cm^3 \cdot g^{-1}$
Macroporosity (mercury porosimetry)
    Intrusion volume: 1.73 $cm^3 \cdot g^{-1}$
    Porosity: 74%
    Bulk density: 0.43 $g \cdot cm^3$
    Density of the skeleton: 1.64 $g \cdot cm^3$ The carbon monolith MS40-carb was subsequently functionalized by the bioelectrocatalyst according to the following process:

Attachment of the Bioelectrocatalyst (Redox Polymer Glucose Oxidase)

A glucose oxidase solution was prepared by mixing 1 μl of concentrated purified glucose oxidase (at 100 mg/ml), sold by Fluka, and 1.5 μl of a 0.1M NaHCO$_3$ solution. 1 μl of a 7 mg/ml NaIO$_4$ solution was subsequently added to this mixture. A 28.6 mg/ml glucose oxidase solution was obtained, which was left standing in the dark for 1 hour.

The bioelectrocatalyst consists of a mixture of 4 μl of a 10 mg/ml solution of the redox polymer in Millipore water, 0.82 μl of the 23 mg/ml glucose oxidase solution as prepared above and 1.67 μl of a 2 mg/ml solution of polyethylene glycol diglycidyl ether (PEGDE) in Millipore water.

The carbon monolith was adhesively bonded to a graphite subelectrode with a diameter of 5 mm (GC electrode, Pine, USA) using a conductive carbon paint and was then subjected to a 1 torr oxygen plasma for 15 minutes.

The bioelectrocatalyst (approximately 6.5 μl) was subsequently deposited at the top of the carbon monolith in order to impregnate the porosity thereof. The monolith was left to dry for 18 hours.

An enzymatic sensor ES-MS40-carb was thus obtained.

As comparative example, a glassy carbon (CC) electrode with a diameter of 5 mm (Pine Research. Instrumentation, Raleigh, North. Carolina, USA) was also functionalized by the bioelectrocatalyst according to the process employed for the MS40-carb monolith.

An enzymatic sensor ES-GC not in accordance with the invention was thus obtained.

These two sensors were subsequently tested for the detection of glucose in a liquid medium. The measurements were carried cut with a bipotentiostat (CH-Instrument, electrochemical detector, model. CHI832) connected to a computer. The temperature of the liquid medium, composed of a $50 \times 10^{-3}$ M solution of glucose in a phosphate buffer (PBS), was regulated at 37.5° C. using a thermostatically controlled bath (Fisher Scientific, Pittsburgh, Pa.). The ES-MS40-carb or ES-GC enzymatic sensors were kept moving in the glucose solution using a Pine Instrument® agitator (Austin, Tex., USA). The measurements were carried out in an electrochemical cell with a water bath.

At the beginning of the experiment, the liquid medium was subjected to bubbling with argon for 15 minutes. In order to keep the volume of the glucose solution constant, the argon was presaturated beforehand with water by passing through a sparging tube comprising PBS.

The potentials were measured with a commercial Ag/AqCl (3M KCl) reference electrode and while using a platinum electrode as counterelectrode (BAS).

Figure 6:
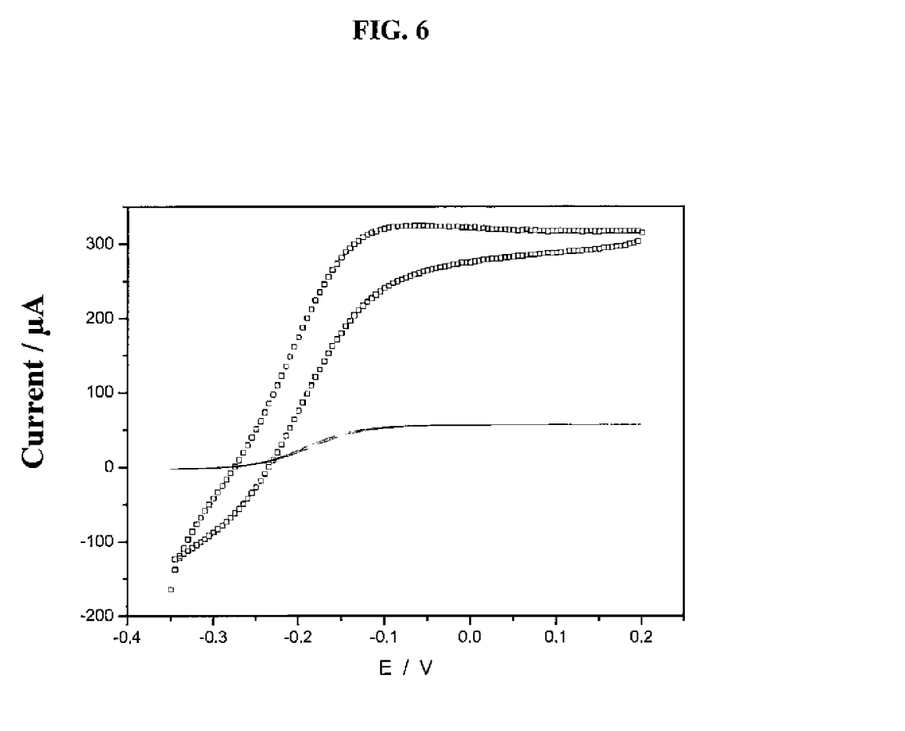
FIG. 6 shows the results obtained with the ES-MS40-carb and ES-GC enzymatic sensors in accordance with one embodiment.

The results obtained with the ES-MS40-carb and ES-GC enzymatic sensors are given in the appended FIG. 6, in which the current density (in μA) is a function of the electric potential (in volts). In this figure, the curve as a continuous line represents the electroreduction of the glucose obtained with the ES-GC sensor not forming part of the invention and the curve with the squares represents the electroreduction of the glucose obtained with the ES-MS40-carb sensor in accordance with the invention.

It is found that, at +0 V/Ag/AgCl, it is possible to oxidize the glucose at a current density of 300 μA using the ES-MS40-carb sensor, against only 25 μA with the ES-GC sensor. It is noted that the curve of the current density as a function of the potential applied is much more exalted in the case of the ES-MS40-carb sensor than in the case of the ES-GC sensor, which reflects the exalted sensitivity of the material provided in the context of the present invention.

What is claimed is:

1. A process for the preparation of a cellular carbon or ceramic monolith comprising a hierarchical porous network comprising interconnected macropores and micropores, said porous network being devoid of mesopores, wherein said process comprises at least the following stages:
    1) a stage of preparation of a solid silica template in the form of a cellular monolith composed of a matrix formed of silica or of organically modified silica, said monolith comprising macropores having a mean dimension $d_A$ of 1 μm to 100 μm, mesopores having a mean dimension $d_E$ of 2 to 50 nm and micropores having a mean dimension $d_I$ of 0.7 to 1.5 nm, said pores being interconnected;

2) a stage of impregnation, under vacuum, of the solid silica template with a solution of at least one carbon precursor or of at least one ceramic precursor selected from the group consisting of preceramic polymers resulting in oxycarbonitrides, carbonitrides, nitrides and boronitrides of carbon;

3) a stage of polymerization, crosslinking, or both polymerization and crosslinking of said precursor within the solid silica template;

4) a stage of carbonization of the solid silica template including said polymerized, crosslinked, or polymerized and crosslinked precursor, 5) the production of said carbon or ceramic monolith by removal of the solid silica template by treatment with an acid or a base, said treatment being carried out without distinction before or after said carbonization stage;

and in that, during the first stage, the silica template is prepared according to a process consisting of:

in preparing an emulsion by introducing an oily phase into an aqueous solution of surfactant, in adding an aqueous solution of at least one silicon oxide precursor, at least one organically modified silicon oxide precursor, or at least one silicon oxide precursor and organically modified silicon oxide precursor to the surfactant solution, before or after the preparation of the emulsion, in leaving the reaction mixture standing until said precursor has condensed, then in drying the mixture in order to obtain the expected solid silica template, and when the silica template is prepared from said aqueous solution of at least one (not organically modified) silicon oxide precursor, then said process furthermore comprises an additional stage consisting in thermally treating the solid silica template at a temperature of at least 650° C.

2. The process as claimed in claim 1, wherein the silicon oxide or organically modified silicon oxide precursor(s) used during the first stage of preparation of the silica template are chosen from silicon tetraalkoxides of following formula (I):

(I)

in which:

R represents an alkyl radical having from 1 to 5 carbon atoms or a group of following formula (II):

(II)

in which $0 \le m \le 5$ and $R_1$ is chosen from a thiol group, a pyrrole group, an amino group which optionally carries one or more alkyl, aminoalkyl or optionally substituted aryl substituents, an alkyl group or a phenyl group which optionally carries a substituent $R_2$ of alkyl type, R' represents an alkyl radical having from 1 to 5 carbon atoms or an aryl radical which optionally carries one or more functional groups, and $0 \le n < m$; m being the valency of the silicon atom.

3. The process as claimed in claim 2, wherein the precursor(s) of formula (I) are selected from the group consisting of tetramethoxysilane, tetraethoxyorthosilane, (3-mercaptopropyl)trimethoxysilane, (3-aminopropyl)triethoxysilane, N-(3-trimethoxysilylpropyl)pyrrole, 3-(2,4-dinitrophenylamino)propyltriethoxysilane, (3-(N-(2-aminoethyl)amino)propyl)trimethoxysilane, phenyltriethoxysilane and methyltriethoxysilane.

4. The process as claimed in claim 1, wherein the silica template obtained at the end of the first stage is washed using an organic solvent and then dried, before being subjected to the stage of impregnation with the solution of carbon precursor or of ceramic precursor.

5. The process as claimed in claim 1, wherein the carbon precursor(s) are selected from the group consisting of phenolic resins, resorcinols, styrene, divinylbenzene, polysaccharides, potato starch, lignin, lignin/cellulose mixtures and petroleum pitches.

6. The process as claimed in claim 1, wherein the ceramic precursor(s) are selected from the group consisting of polyaminoborazines and their derivatives and polycarbazides and their derivatives.

7. The process as claimed in claim 1, wherein the solvent of the solution of carbon precursor or of ceramic precursor is an organic solvent selected from the group consisting of lower alcohols, tetrahydrofuran, toluene and their mixtures.

8. The process as claimed in claim 1, wherein the precursor is a carbon precursor selected from the group consisting of phenolic resins and in that the solvent is selected from the group consisting of water and mixtures of water with at least one organic solvent selected from the group consisting of lower alcohols, tetrahydrofuran and toluene, in the presence of a base.

9. The process as claimed in claim 1, wherein the stage of carbonization of the silica template impregnated with polymerized, crosslinked, or polymerized and crosslinked carbon or ceramic precursor is carried out under a reducing atmosphere, at a temperature varying from 500 to 1200° C.

10. The process as claimed in claim 1, wherein the carbonization stage is carried out at a temperature of less than or equal to 700° C. and in that the carbon or ceramic monolith obtained on conclusion of the process exhibits an electronically nonconducting amorphous structure.

11. The process as claimed in claim 1, the carbonization stage is carried out at a temperature of greater than 600° C. and in that the carbon or ceramic monolith obtained on conclusion of the process exhibits a semigraphitized structure and is an electronic semiconductor.

12. A cellular solid material provided in the form of a porous carbon or ceramic monolith, wherein said material comprises a hierarchical porous network composed of interconnected macropores and micropores, in which:

i) the macropores have a mean dimension $d_A$ of 1 μm to 100 μm and have walls having a thickness of 0.5 to 40 μm, and the macroporous network is composed of hollow carbon or ceramic sphere placed next to one another, and ii) the micropores have a mean dimension $d_I$ of 0.7 to 1.5 nm and are present in the thickness of the walls of the macropores, rendering the walls microporous, and said material being devoid of mesoporous network.

13. The material as claimed in claim 12, wherein said material's specific surface is from 400 to 900 m$^2$/g.

14. The material as claimed in claim 12, wherein said material exhibits an amorphous structure and is electrically nonconducting.

15. The material as claimed in claim 12, wherein said material exhibits a semigraphitized structure and is electrically semiconducting.

16. The material as claimed in claim 15, the conductivity of said material varies from 2 to 20 S·cm$^{-1}$.

* * * * *